July 6, 1926. 1,591,622
F. D. HARDESTY
FOUR-WHEEL BRAKE
Filed Nov. 7, 1923 2 Sheets-Sheet 1

Witnesses Inventor.

July 6, 1926.

F. D. HARDESTY

FOUR-WHEEL BRAKE

Filed Nov. 7, 1923

Witnesses

Inventor.

Patented July 6, 1926.

1,591,622

UNITED STATES PATENT OFFICE.

FRANCIS D. HARDESTY, OF DAYTON, OHIO, ASSIGNOR TO GENERAL MOTORS CORPORATION, OF DETROIT, MICHIGAN, A CORPORATION OF DELAWARE.

FOUR-WHEEL BRAKE.

Application filed November 7, 1923. Serial No. 673,362.

This invention relates to brake controlling devices for vehicles having brakes on both guiding and driving wheels.

It is among the objects of the present invention to relieve the brake pressure on the guiding wheels of the vehicle when such vehicle is in a turn or more especially when the said wheels are moved out of straight forward position.

Another object is to regulate the amount of brake pressure on the guiding wheels of a vehicle in accordance with the position of said wheels, that is, with increasing movement of the guiding wheels out of straight forward running position, the brake pressure thereon will be proportionately relieved.

A still further object is to adjust the brake operating mechanism by means of the operation of the steering means of the vehicle so that when said means is operated to move the guiding wheels of the vehicle the brake operating mechanism will be automatically adjusted to apply a predetermined portion of the entire brake pressure applied, to the front wheels in accordance with the position to which the guiding wheels have been moved.

Further objects and advantages of the present invention will be apparent from the following description, reference being had to the accompanying drawings, wherein a preferred embodiment of one form of the present invention is clearly shown.

Figure 1:
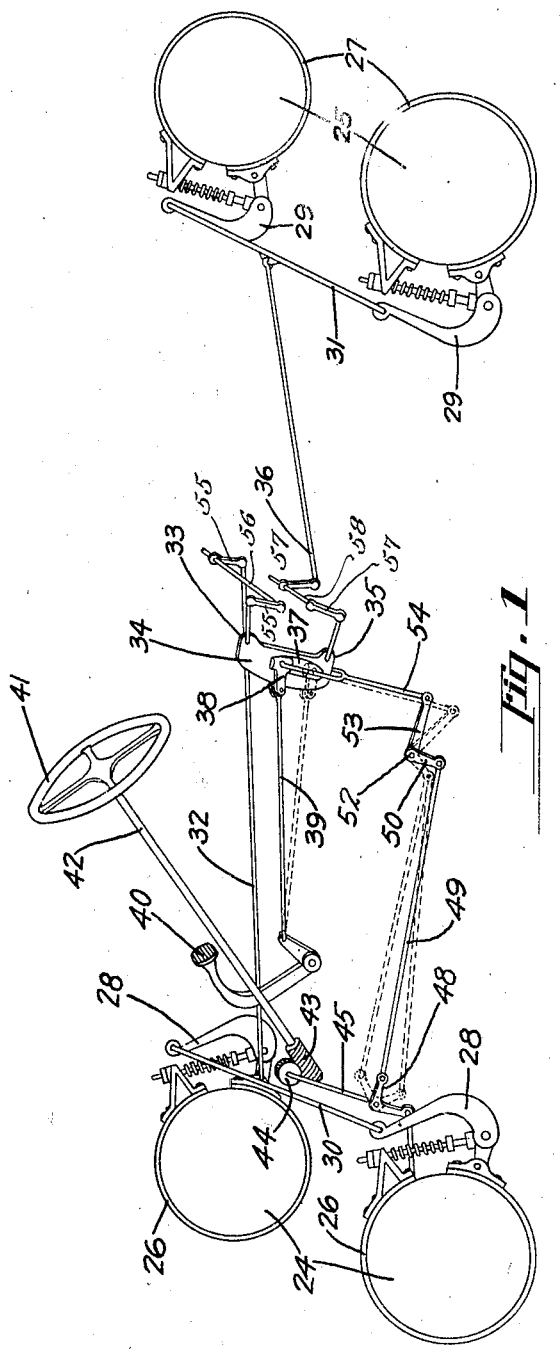
Fig. 1 is a general assembly view of the brake controlling device attached to a four-wheel motor vehicle.
Figure 2:
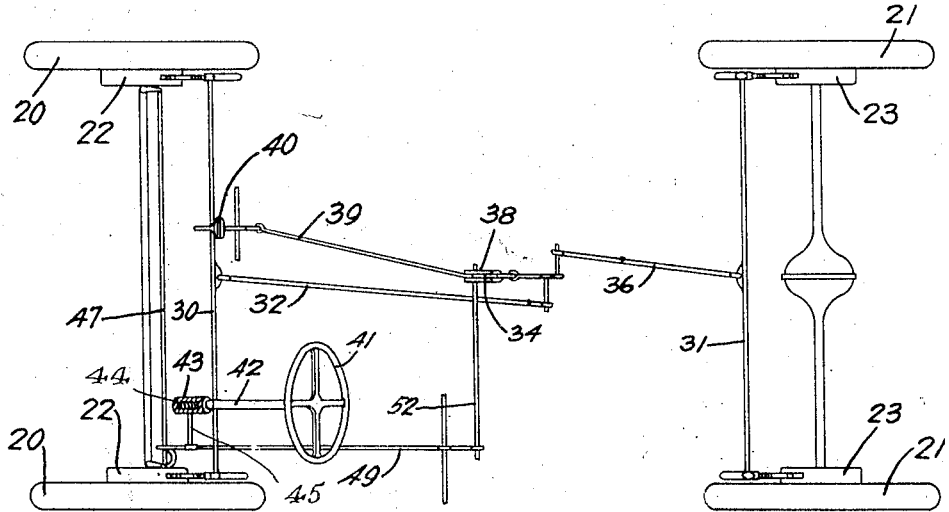
Fig. 2 is a plan view of the device showing the guiding wheels of the vehicle in straight forward running position.
Figure 3:
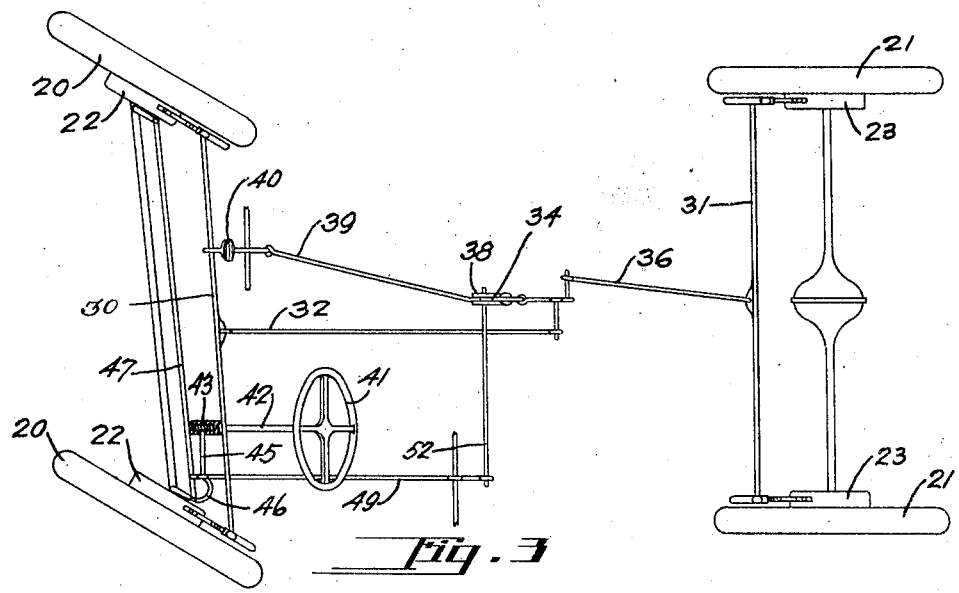
Fig. 3 is a view similar to Fig. 2 showing the guiding wheels of the vehicle moved to the right out of straight forward running position.

Referring to the drawings, the vehicle is shown including two guiding wheels 20 and two driving wheels 21. Each of the guiding wheels 20 is provided with a brake 22 while each of the driving wheels 21 is provided with a brake 23.

Each of these brakes includes a brake drum having a brake band associated therewith. The front wheel brake drums are designated by the numeral 24, while the rear wheel brake drums are designated by the numeral 25. 26 designates the brake bands associated with the brake drums 24, while 27 designates the brake bands associated with the driving wheel brake drums 25. The brake bands of these various brakes are adapted to be operated by a lever associated with each band. The two levers associated with the driving wheel brake bands are designated by the numeral 29 while the levers associated with the guiding wheel brake bands are designated by the numeral 28. For the purpose of illustration the two levers 28 on the guiding wheel brakes are connected together by means of a cross member 30, while the similar levers of the driving wheel brake bands are connected together by means of the cross member 31. A rod 32 connected to the cross member 30, intermediate the levers 28, is operatively connected with one end 33 of the common lever 34 through arms 55 fast upon a transversely extending oscillating shaft 56. The cross member 31 of the driving wheel brakes is connected with the opposite end 35 of lever 34 by means of suitable connecting linkage including the rod 36 and arms 57 upon a similar oscillating shaft 58. The lever 34 is provided with a longitudinal slot 37 in which is positioned the fulcrum element or saddle 38. A rod 39 is connected to this element 38, said rod also being connected to the energy applying means or brake pedal 40. The normal position of the fulcrum element or saddle 38 in the slot 37 of lever 34 is substantially midway between the ends 33 and 35 of said lever to which the operating rods of the guiding and driving wheel brakes respectively are connected. The lever 34 and arms 55, 57 are assumed to be vertical or substantially so, although the particular location and arrangement of these and other elements of my invention are matters of secondary importance, and may be varied.

The steering means of the vehicle which is adapted to control the position of the guiding wheel 20, comprises a steering wheel 41 secured to one end of the steering column 42. To the opposite end of this steering column there is provided a worm gear 43 in operative connection with the pinion 44 which in turn is secured to a cross shaft 45. This cross shaft is shown as connected with the guiding wheels of the vehicle through a bell crank lever fast upon the shaft 45 and having a rearwardly extending arm 48, the usual drag link 46 and tie rod 47 connecting the steering knuckles.

The brake adjusting or proportioning device comprises the rearwardly extending arm 48 which is normally in horizontal position. One end of a rod 49 is secured to this horizontal arm while the opposite end of said rod is secured to the free end of a normally vertical arm portion 50 fast upon an oscillating cross shaft 52, which shaft has a second arm 53 located beneath the lever 34. These two arms form in effect a bell crank lever rotatably supported by cross shaft 52. The horizontal arm portion 53 is connected to the lower end of the connecting link 54, the opposite end of said connecting link being secured to the fulcrum element or saddle 38.

As has been mentioned heretofore, when the steering apparatus is in a position where the guiding wheels 20 of the vehicle are held in straight forward running position, the arm 48 will be in horizontal position, the arm portion 50 of the bell crank lever 50—53 in a vertical and the arm portion 53 in a horizontal position. The fulcrum element or saddle 38 being connected to the arm 53 will also be held in normal position which, as has been mentioned heretofore is approximately midway the ends 33 and 35 of the lever 34. When braking energy is applied by the operation of the pedal 40, a pull will be exerted upon the fulcrum 38 of the lever 34 through the link connection 39 and due to this fulcrum being midway the ends of the lever, a substantially equal division or proportioning of the braking energy between the guiding wheel brakes and the driving wheel brakes will be effected.

Now when the steering apparatus is operated to deflect the guiding wheels from the normal straight forward running position, to either one side or the other, the arm 48 will be moved in a vertical plane either above or below the horizontal position, thus exerting a pull upon the vertical arm of the bell crank lever 50—53. This will tend to rotate the bell crank lever in a clockwise direction thus tending to operate the connecting link 54 to move the fulcrum element or saddle 38 in the slot 37 into closer proximity to the end 35 of the lever 34. Application of braking energy upon the pedal 40 will exert a pull on the fulcrum element or saddle 38 which in this case however, will, due to its position in the lever 34 proportionately divide this energy between the guiding wheel brakes and the driving wheel brakes depending of course upon the relative position of said fulcrum element to the two ends of the lever to which said brakes are connected. It may clearly be seen that the closer the fulcrum element or saddle 38 is moved toward the end 35, the greater will be the proportion of energy exerted upon the driving wheel brakes and the lesser will be the energy exerted upon the guiding wheel brakes. This will tend to relieve the braking effort on the front wheels proportionately with the degree of turn of the vehicle. When the steering apparatus is returned from the wheel deflecting position to the normal or straight forward running position, the action of the linkage between the steering apparatus and the brake energy applying means is reversed. That is, the arm 48 moving toward the normal horizontal position will exert a push on the connecting rod 49, thus tending to rotate the bell crank lever to which it is connected in a counterclockwise direction, which, due to the link connection 54, will again move the fulcrum element or saddle 38 to its normal position in the slot 37 which as has been mentioned is substantially midway between the ends 32 and 35 of the lever 34. In this position the brake operating device is set to provide substantially equal braking effort on all wheels.

From the aforegoing it may be seen that the connection between the various elements are of such a nature as to transmit positive motion from one element to another in either direction.

While the form of embodiment of the invention as herein disclosed, constitutes a preferred form, it is to be understood that other forms might be adopted, all coming within the scope of the claims which follow.

What is claimed is as follows:

1. A braking device for vehicles having brakes associated with the guiding and driving wheels, comprising in combination a set of operating levers associated with the guiding wheel brakes and a set associated with the driving wheel brakes, both sets being connected with a common lever; brake energy applying means connected to the common lever and adjustably secured thereto; means for adjusting said connection, said means comprising steering means for controlling the position of the guiding wheels; a normally horizontal arm fixed to the steering means and movable thereby in a vertical plane; a linkage connecting the arm to the aforementioned adjusting means whereby when the steering means is operated the said arm is moved vertically, and through the linkage, affects the connection between the brake energy applying means and the common lever in accordance with the position of the steering means.

2. A braking device for vehicles having brakes associated with the guiding and driving wheels comprising in combination, a separate set of operating rods for the guiding wheel brakes and a set for the driving wheel brakes; a common lever having both sets of brake operating rods connected thereto; a pedal for applying braking energy; connecting linkage between the pedal and the common lever and adjustably secured to the latter; a steering device for controlling the guiding wheels, said device including an angular lever having an arm in horizontal position when the guiding wheels are in straight line position, a bell crank lever comprising a vertical arm and a horizontal arm; a rod connection between the horizontal lever arm of the steering device and the vertical arm of the bell crank lever; and a link connecting the horizontal arm of the bell crank lever and said connecting linkage, whereby, when the angular lever of the steering device is operated to move the arm thereof out of normal horizontal position, the connecting linkage between the pedal and the common lever will be adjusted in accordance with the position of the angular lever, to proportion the energy applied by the braking pedal in predetermined amounts between the guiding and driving wheels.

3. In a mechanism for distributing brake energy between two sets of brakes upon a vehicle, said mechanism including, a lever to the ends of which are connected the operating means for the respective sets of brakes and to the fulcrum of which braking energy is applied, said mechanism also including means connecting said fulcrum with the steering apparatus for said vehicle whereby the fulcrum is adjusted upon said lever in accordance with the position of the steering apparatus; means for adjusting the fulcrum of the lever from the steering apparatus, comprising positively acting linkage between the fulcrum and an arm upon the steering apparatus so constructed and arranged that when the said arm is moved out of normal position the fulcrum will be moved toward one end of the lever and when the arm is returned to normal position, the fulcrum will also be returned to its original position.

4. In a mechanism for distributing braking energy between two sets of brakes upon a vehicle, said mechanism including, a lever to the ends of which are connected the operating means for the respective sets of brakes and to the fulcrum of which braking energy is applied, said mechanism also including means connecting said fulcrum with the steering apparatus for said vehicle whereby the fulcrum is adjusted upon said lever in accordance with the position of the steering apparatus, means for adjusting the fulcrum of the lever from the steering apparatus comprising a normally horizontal arm fixed to the steering apparatus and movable thereby in a vertical plane; a bell crank lever including a vertical arm and a horizontal arm; a link connecting the horizontal arm fixed to the steering apparatus and the vertical arm of the bell crank lever; and a link connecting the horizontal arm of the bell crank lever and the fulcrum of the lever to which the brake operating means are connected whereby, when the arm fixed to the steering apparatus is moved out of horizontal position, the fulcrum of the lever associated with the brake operating mechanism will be adjusted in accordance with the position of the steering apparatus to proportion the energy applied on the brake operating lever in predetermined amounts to vary the braking effort on the two sets of brakes.

In testimony whereof I hereto affix my signature.

FRANCIS D. HARDESTY.